United States Patent

Kim

[11] Patent Number: 5,919,314
[45] Date of Patent: Jul. 6, 1999

[54] SUN TRACKING SYSTEM AND METHOD USING SOLAR ARRAY

[75] Inventor: Il Song Kim, Kwangju, Rep. of Korea

[73] Assignee: Hyundai Electronics Industries Co. Ltd., Rep. of Korea

[21] Appl. No.: 08/774,152

[22] Filed: Dec. 26, 1996

[30] Foreign Application Priority Data

Dec. 29, 1995 [KR] Rep. of Korea .................... 95-66509

[51] Int. Cl.$^6$ ........................................ G01J 1/20
[52] U.S. Cl. .................. 136/246; 136/291; 136/292; 250/203.4; 323/906; 244/173
[58] Field of Search .................... 136/246, 291, 136/292; 250/203.4; 323/906; 244/173

[56] References Cited

U.S. PATENT DOCUMENTS

| | | |
|---|---|---|
| 4,086,485 | 4/1978 | Kaplow et al. .................... 250/203 R |
| 4,868,379 | 9/1989 | West .................... 250/203 R |
| 5,228,644 | 7/1993 | Garriott et al. .................... 244/173 |

*Primary Examiner*—Alan Diamond
*Attorney, Agent, or Firm*—Fish & Richardson P.C.

[57] ABSTRACT

A sun tracking system and method for tracking the position of the sun. The sun tracking system includes an on-board computer for controlling each device; a solar array driving unit for rotating a solar array and for transmitting an array angle to the on-board computer; an array tilt mechanism for adjusting a tilt of the solar array and for transmitting an tilt angle to the on-board computer; the solar array connected to the solar array driving unit and to the array tilt mechanism, for supplying a current and a voltage to a peak power tracker; and the peak power tracker for supplying a power generated from the solar array to each part of a satellite and for supplying a peak power to the on-board computer.

4 Claims, 1 Drawing Sheet

SUN TRACKING SYSTEM AND METHOD USING SOLAR ARRAY

BACKGROUND OF THE INVENTION

The present invention relates to a sun tracking system and method using a solar array and, more particularly, to a sun tracking system and method for tracking the position of the sun by using a power generated from a solar array.

In a conventional artificial satellite, the position of the sun is tracked by detecting a current generated from a sun sensor. This uses the principle that the current generated from the sun sensor is inversely proportional to an angle between the sun and a normal surface of the sun sensor. In order to achieve such an apparatus for tracking the sun, there is needed a scanning driving device such as a rotary mirror. Further, in order to detect a variation in a minute current, there is required a current detecting device of high precision.

A technique of a negative impedance peak power tracker disclosed in U.S. Pat. No. 5,493,204 has a structure including a converter, tracking means and control means so as to obtain a peak power of a solar array. However, the above U.S. Pat. No. 5,493,204 for obtaining the peak power of the solar array has a disadvantage in that the position of the sun can not be tracked.

SUMMARY OF THE INVENTION

In accordance with one aspect of the present invention, the position of the sun can be detected by monitoring a power generated from a solar array which is an indispensable unit for supplying a power source to an artificial satellite. Therefore, a solar tracking system according to the present invention can replace a sun sensor in an emergency as well as a function of a conventional satellite using the sun sensor. Since the sun tracking system is effective only by adding a program to a previously installed on-board computer without requiring an additional device or hardware, the cost is saved and the reliability is improved.

The present invention can detect the position of the sun by using the principle that a power generated from the solar array is in inverse proportion to an angle between the sun and a normal surface of the solar array. The present invention is applicable to the conventional satellite by using a power system of an artificial satellite and to a case when a solar power system is constructed from the ground.

BRIEF DESCRIPTION OF THE ATTACHED DRAWINGS

The above advantages of the present invention will become more apparent by describing in detail the preferred embodiment of the present invention with reference to the attached drawing in which:

FIG. 1 is a block diagram of an artificial satellite power system according to the present invention.

DETAILED DESCRIPTION OF PREFERRED EMBODIMENT

Figure 1:
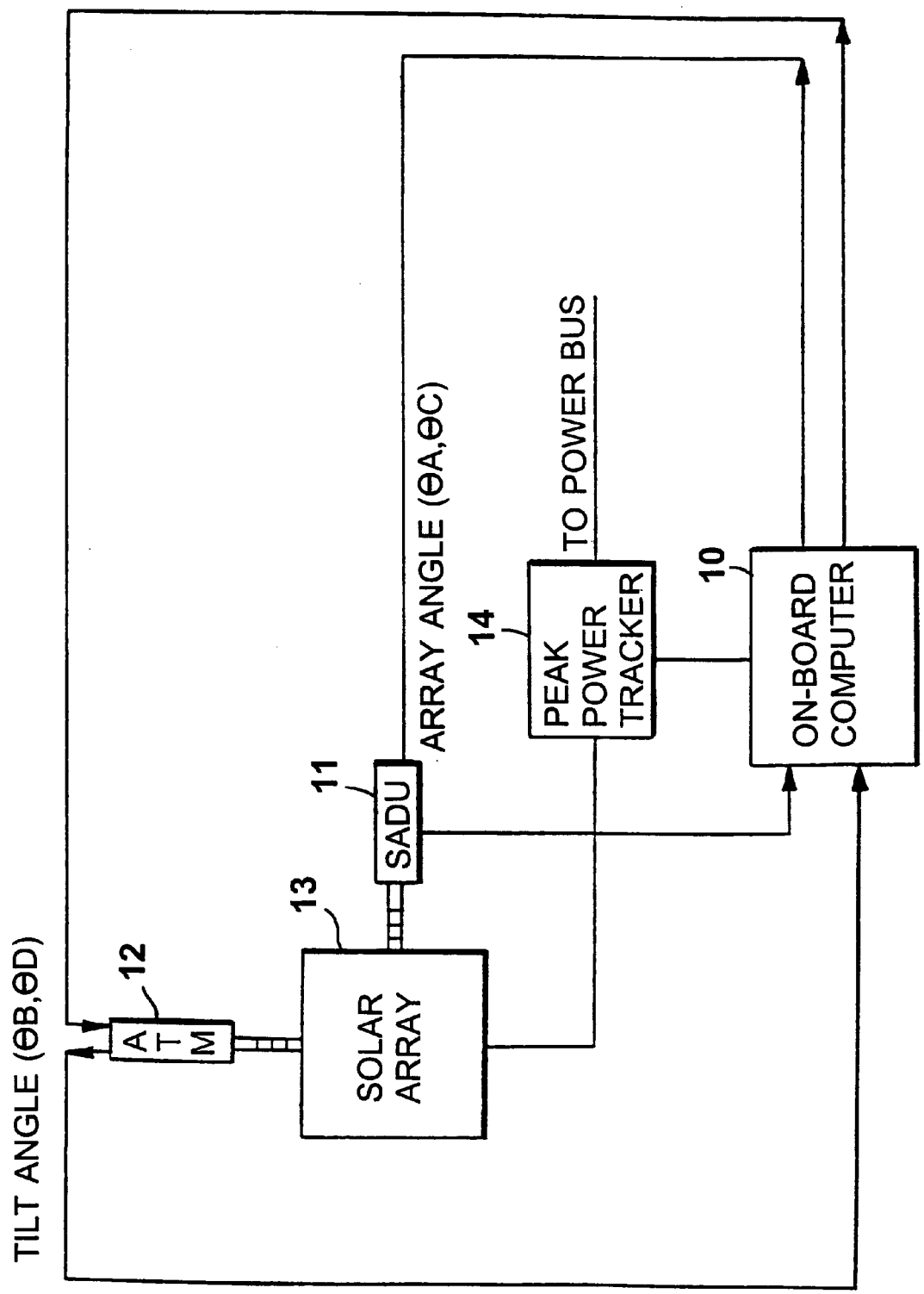

Referring to FIG. 1, an on-board computer 10 controls each device and has a program for tracking the position of the sun. A solar array driving unit (SADU) 11 operated by a control command of the on-board computer 10 rotates a solar array 13 and transmits an array angle to the on-board computer 10. An array tilt mechanism (ATM) 12 operated by the control command of the on-board computer 10 adjusts a tilt of the solar array 13 and transmits a tilt angle to the on-board computer 10. The solar array 13 connected to the SADU 11 and to the ATM 12 supplies a current and a voltage to a peak power tracker (PPT) 14. The PPT 14 supplies a power generated from the solar array 13 to each part of a satellite and supplies a peak power to the on-board computer 10.

In operation, if the on-board computer 10 transmits a SADU driving command to the SADU 11, the SADU 11 is operated to rotate the solar array 13. If a variation of the power of the solar array 13 is greater than 0, the on-board computer 10 perceives this through the PPT 14 and again transmits the control command to the SADU 11, thereby rotating the solar array 13 in the same direction. If the variation of the power of the solar array 13 is less than 0, the SADU 11 rotates the solar array 13 in an opposite direction so as to approach the sun. In this case, the power is monitored by the on-board computer 10 through the PPT 14. An array angle $\theta A$ is obtained by stopping the SADU 11 at a peak power point. It will be understood that the array angle $\theta A$ can be obtained by comparing a driving value of SADU 11 with an initial value thereof.

If the on-board computer 10 transmits an ATM driving command to the ATM 12, the ATM 12 is driven to tilt the solar array 13. The ATM 12 supplies a tilt angle to the on-board computer 10. If the variation of the power of the solar array 13 is greater than 0, the ATM 12 tilts the solar array 13 in the same direction. If the variation of the power of the solar array 13 is less than 0, the ATM 12 tilts the solar array 13 in an opposite direction so as to approach the sun. The generated power is monitored by the on-board computer 10 through the PPT 14. An array angle $\theta B$ is obtained by stopping the ATM 12 at the peak power point. The angles $\theta A$ and $\theta B$ are points in which the solar array 13 and the sun are in a normal position.

Such processes are repeated after a time T. That is, another array angle $\theta C$ is obtained by stopping the SADU 11 at the peak power point after the SADU 11 is operated. Another tilt angle $\theta D$ is obtained by stopping the ATM 12 at the peak power point after the ATM 12 is driven.

Consequently, variations in the position of the sun per time are $(\theta C - \theta A)/T$ and $(\theta D - \theta B)/T$. The on-board computer 10 causes the SADU 11 to rotate the solar array 13 at a speed of $(\theta C - \theta A)/T$ at a point of the array angle $\theta C$ and causes the ATM 12 to tilt the solar array 13 at a speed of $(\theta D - \theta B)/T$ at a point of the tilt angle $\theta D$, thereby tracking the position of the sun.

As described above, the position of the sun is detected by monitoring the power generated from the solar array. Therefore, the inventive sun tracking system can accommodate a function of a conventional satellite using the sun sensor. Even if the sun sensor is out of order or in a malfunction, since the sun tracking system is effective only by adding a program to the on-board computer without altering or adding a system, the cost is saved and the reliability is improved.

What is claimed is:

1. A system for tracking the sun, comprising:
   an on-board computer for controlling each device, said on-board computer having an algorithm for tracking the position of the sun;
   a solar array driving unit for rotating a solar array and for transmitting an array angle to said on-board computer, said solar array driving unit being operated by a command of said on-board computer;
   an array tilt mechanism for adjusting a tilt of said solar array and for transmitting a tilt angle to said on-board computer, said array tilt mechanism being operated by a command of said on-board computer;

said solar array connected to said solar array driving unit and to said array tilt mechanism, for supplying a current and a voltage to a peak power tracker; and said peak power tracker for supplying a power generated from said solar array to each part of a satellite and for supplying a peak power to said on-board computer;

whereby the sun can be tracked by using the principle that the power generated from said solar array is inversely proportional to an angle between the sun and a normal surface of said solar array.

2. A method for tracking the sun, comprising the steps of:

(a) rotating a solar array by operating a solar array driving unit from an on-board computer, and stopping said solar array driving unit at a peak power point by monitoring a power generated from said solar array, thus to obtain a first array angle $\theta A$;

(b) tilting said solar array by driving an array tilt mechanism from said on-board computer, and stopping said array tilt mechanism at the peak power point by monitoring the power, thus to obtain a first tilt angle $\theta B$;

(c) repeating said steps of (a) and (b) after a given time T to obtain a second array angle $\theta C$ and a second tilt angle $\theta D$, and causing said solar array driving unit to rotate said solar array at a speed of $(\theta C - \theta A)/T$ at a point of said second array angle $\theta C$; and (d) causing said array tilt mechanism to tilt said solar array at a speed of $(\theta D - \theta B)/T$ at a point of said second tilt angle $\theta D$.

3. A method for tracking the sun as claimed in claim 2, wherein said step of rotating a solar array is implemented in such a way that if a variation of the power of said solar array is greater than 0, said solar array is rotated in the same direction, and if a variation of the power of said solar array is less than 0, said solar array is rotated in an opposite direction.

4. A method for tracking the sun as claimed in claim 2, wherein said step of tilting said solar array is implemented in such a way that if a variation of the power of said solar array is greater than 0, said solar array is tilted in the same direction, and if a variation of the power of said solar array is less than 0, said solar array is tilted in an opposite direction.

* * * * *